United States Patent Office 2,945,001
Patented July 12, 1960

2,945,001
SYNERGISTIC ANTIOXIDANTS

Ronald B. Spacht, Franklin Township, Portage County, Ohio, assignor to The Goodyear Tire & Rubber Company, Akron, Ohio, a corporation of Ohio No Drawing. Filed Aug. 27, 1956, Ser. No. 606,218

11 Claims. (Cl. 260—45.95)

The invention relates to the preservation of rubber, and more particularly, to the provision and use of a new class of synergistic age resistors for rubber.

Rubber is subject to deterioration from many sources, such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would be one which would protect rubber from deterioration regardless of kind, in the cured or uncured state, no matter where used. Since no such antioxidant has been discovered, compromises must be made in the selection of an antioxidant for use in rubber.

According to the present invention, a synergistic mixture of phenols has been discovered which exhibit unusual and unexpected antioxident activity, are relatively non-volatile and are non-discoloring when used in rubber. They exhibit a high degree of protection for rubber against sunchecking and against atmospheric oxygen. Also, they are derived from cheap raw materials and hence possess an economic advantage over most antioxidants of this general class.

It is, therefore, an object of this invention to provide and antioxidant composition which is capable of protecting rubbers for extended periods of time. It is another object of this invention to provide a synergistic antitoxidant. It is a further object of this invention to protect rubbers against deterioration by oxidation by means of a mixture of phenolic antioxidants whose combined activity is greater than the activity of any component.

In the practice of this invention, the synergistic antioxidant compositions are comprised of mixtures of aralkyl phenols and tertiary alkyl phenols wherein each phenol ring of the latter components contains at least two tertiary alkyl groups containing from 4 to 9 carbon atoms. The synergistic antioxidant compositions of this invention can also be described as being comprise of a mixture of (1) aralkyl phenols conforming to the following structural formula

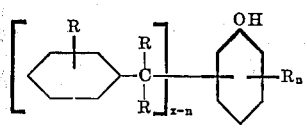

wherein R is selected from the group consisting of hydrogen and alkyl radicals having from 1 to 9 carbon atoms, $n$ is selected from the group consisting of 0, 1 and 2, and $x$ is selected from the group consisting of 1, 2 and 3, and wherein the value of $n$ is always at least 1 less than the value of $x$; and (2) tertiary alkylated phenols conforming to the following structural formula

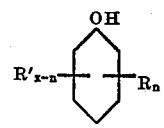

wherein $x$ is selected from the group consisting of 2 and 3 and $n$ is selected from the group consisting of 0, 1, 2, and 3 but not exceeding the value of $x$ and wherein R is selected from the group consisting of tertiary butyl and tertiary amyl radicals and R' is selected from the group consisting of tertiary octyl and tertiary nonyl radicals, R and R' being attached to the benzene ring in the 2, 4 and 6 positions. Preferably, a major proportion of the latter mixture is comprised of tri-tertiary-alkylated phenols wherein 2 of said tertiary alkyl radicals are selected from the group consisting of tertiary octyl and tertiary nonyl radicals and wherein the third tertiary alkyl radical is selected from the group consisting of tertiary butyl and tertiary amyl radicals.

Because it is unnecessary to isolate the pure compositions of the synergistic components, mixtures of the reaction products are used which can be defined as a synergistic antioxidant composition comprising a mixture of (1) the reaction products of a phenol and an organic material selected from the group consisting of a styrene, a vinyl toluene and a benzyl halide and (2) the alkylated reaction products resulting from the reaction of phenol and at least two tertiary olefins, one of said olefins being selected from the group consisting of tertiary octenes and tertiary nonenes and another of said olefins being selected from the group consisting of isobutylene and tertiary pentenes.

The aralkyl phenols can be prepared by condensing a phenolic compound with a substituted aryl compound such as a substituted aryl alkene hydrocarbon or a benzyl halide. Among the phenolic compounds which can be employed in the condensation reaction of this invention are phenol, the cresols, the xylenols, p-octyl phenol, the propyl phenols, the isopropyl phenols, the butyl phenols, etc.

Any aryl-substituted alkene hydrocarbons (also called aralkylene hydrocarbons) can be employed in the condensation process of this invention. Such compounds will, of course, contain an aryl radical connected to an aliphatic carbon chain in which there is an olefinic double bond. The preferred aralkylene hydrocarbons are those of the structure

wherein Ar is aryl and R is hydrogen or alkyl among which there may be mentioned styrene, alpha-methyl styrene, alpha-ethyl styrene, p-methyl styrene, p-isopropyl styrene, p-methyl-alpha-methyl styrene, beta-methyl styrene, and the like. Other aryl-substituted alkene hydrocarbons which may be used are allyl benzene and methallyl benzene and the like. Preferably, styrene, vinyl toluene, or benzyl chloride is used as the aralkyl reactant.

The aralkyl phenols can be prepared in the following manner.

The phenolic compound and an acid catalyst are warmed, after which from 1 to 3 molecular equivalents of an arylalkene compound are added while keeping the temperature below 150° C. After the reaction is completed, the catalyst is destroyed by neutralization. The compounds may be used in the crude form, or they may be purified by removing unreacted materials by vacuum distillation.

Examples of the aralkyl phenols of this invention are mono, di and tri-alphaphenylethyl phenol mono, di and tri-alphatolylethyl phenol; mono, di and tri-phenylmethyl phenol and the corresponding mono and di-cresols and xylenols, etc., including alkyl substitution on the phenolic ring containing up to 9 carbon atoms.

The tertiary alkyl phenols of this invention are phenols having at least two unlike tertiary alkyl radicals attached to the ring, at least one of the radicals being selected from the group consisting of tertiary octyl and tertiary nonyl radicals and at least one being selected from the group consisting of tertiary butyl and tertiary amyl radicals, as described and claimed in copending Serial No. 379,089, filed September 8, 1953.

In the practice of this invention, the tertiary alkylated phenolic compounds can be made by reacting phenol with an olefin selected from the group consisting of tertiary octenes and tertiary nonenes and then with another olefin selected from the group consisting of isobutylene and tertiary amylenes. Mixtures of octenes and/or nonenes and mixtures of isobutylene and/or amylenes can be used, if desired.

Examples of the tertiary alkyl phenols of this invention are the various di and tri-substituted tertiary butyl, amyl, octyl and nonyl phenols, wherein the phenol rings are substituted with at least 2 unlike groups.

The maximum effect is to be gained by having a tri-tertiary alkyl substiuted phenol. Unfortunately, process limitations will not allow this desirable condition where the alkylation is comprised of relatively large groups. By the practice of this invention, the maximum effect is obtained by securing substantial tri-tertiary substitution of the phenol nucleus with octyl, nonyl, butyl or amyl groups. In order to obtain this desired condition, the heavier tertiary olefin is reacted with phenol first and thereafter the product of that reaction is reacted with the lighter tertiary olefin.

While the invention includes the isolation and use of the individual compounds, the composite reaction products are preferred as synergists, thereby saving the additional cost of purification or separation. The products may be produced from pure compounds or from mixtures of compounds.

The synergistic mixtures can range from 90–10 to 10–90% by weight and still obtain the desired synergistic effect. Preferably, the mixtures will range closer to equal proportions, e.g., 80–20 to 20–80% by weight and 70–30 to 30–70% by weight.

For best results, the reaction temperature during preparation of either component of the synergistic mixture will ordinarily be maintained within a range of 50° C. to 150° C. If the temperature is too high, the alkylation catalyst may become a catalyst for dealkylation. During the second stage of the alkylation process in the preparation of the tertiary alkyl phenols, it is often desirable to maintain the temperature below 90° C. in order to prevent dealkylation and in order to obtain more complete alkylation. The temperature will, of course, vary with variations in customary reaction conditions such as, for example, pressure, catalyst used, reactants, etc.

In the preparation of the synergistic components, one or more of the customary acidic alkylation catalysts is used to activate and accelerate the reactions. For example, sulfuric acid, benzene sulfonic acid, toluene sulfonic acid, activated clays, stannic chloride, ferrous chloride, boron trifluoride, zinc chloride, the ferrous and ferric halides, the stannous and stannic halides, aluminum halide and aluminum oxide will activate the reactions. Usually, concentrated sulfuric acid is used as the alkylation catalyst. The catalyst will ordinarily be used in an amount of at least 0.5% of the total weight of reactants in order to obtain proper action. Larger amounts of catalyst, for example, up to 5.0% by weight of the reactants is satisfactory.

Although not limited thereto, the invention is more specifically illustrated by a detailed description of the preparation of a synergistic mixture.

One hundred eighty-eight grams of phenol and 12 grams of $H_2SO_4$ were heated to 70° C. To this mixture, 448 grams of diisobutylene were added during a period of 1¼ hours while keeping the temperature below 80° C. The mixture was held between 70 and 80° C. for another two hours. Thereafter, 112 grams of isobutene were added during a period of 2¼ hours while keeping the temperature between 70 and 80° C. Fifteen grams of NaOH in 50 milliliters of $H_2O$ were added to destroy the catalyst. The mixture was digested and then the water layer was allowed to settle and was separated. The mixture was then heated to a column temperature of 150° C. at a pressure of 20 millimeters. The product weighed 600 grams, which represents an 80% yield.

One hundred eighty-eight grams of phenol and 1.0 gram of concentrated $H_2SO_4$ were heated to 140° C. Four hundred-sixteen grams of styrene were then added during a period of two hours while keeping the temperature below 150° C. The mixture was allowed to stand at 150° C. for ½ hour before adding 5.0 grams of solid, finely divided anhydrous $Na_2CO_3$. The neutralized mixture was filtered hot to remove any suspended solids. A quantitative yield was obtained.

One hundred grams of each material were mixed and stirred together until the two liquids were uniformly blended and thereafter milled into compounded oil-extended cold butadiene-styrene polymer rubber (GR–S) as hereinafter indicated.

The efficacy of the synergistic products of this invention as antioxidants or age resistors for natural rubber, synthetic rubbers and rubber-like materials is illustrated by the following described tests. The products of the invention were comprised of a 50–50% by weight mixture of the reaction products of 1 mol of phenol and 2 mols styrene and the reaction products of 1 mol of phenol and 2 mols of diisobutylene plus 1 mol of isobutylene. This synergistic mixture was compounded into the following rubber formulation:

| | |
|---|---|
| Oil-extended cold butadiene-styrene polymer (GR–S) | 137.5 |
| Sulfur | 2.0 |
| Zinc oxide | 5.0 |
| Stearic acid | 1.5 |
| Benzothiazyl disulfide | 0.75 |
| Diphenyl guanidine | 1.0 |
| Antioxidant | 1.25 |

Samples were cured for 90 minutes at 285° F. After curing, the samples were aged for 1 year in an oven at 120° F. in closed containers. Creep data were then obtained by preparing thin .025″ bands of gum vulcanizates which were placed in an oven at 100–120° C. under stress of 30 p.s.i. The creep is the rate of elongation. The test is described in detail by Lichty, Spacht and Hollingshead, Industrial and Engineering Chemistry, 47, 165 (1955).

Data are summarized below:

Table I

| Antioxidant | Hours to 20% Creep | Percent Improvement Over Control |
|---|---|---|
| Control—No antioxidant | 5.2 | |
| Styrenated phenol | 9.0 | 73 |
| 2,4,6-Tri-tertiary alkylated phenol | 11 | 111 |
| 50-50 Mixture of above | 13.3 | 155 |

These data show that the mixture was vastly superior to either component and thus illustrates an unexpected synergistic effect from use of the mixture.

The rubbers which can be protected by the products of this invention are oxidizable, rubbery polymers of conjugated dienes which include natural rubber and the various synthetic diene rubbers which are similar to natural rubber in their aging characteristics, such as polychloroprene; Butyl rubber, which is a polymerization product of a major proportion of a mono olefin, such as isobutylene, and a minor proportion of a multi-olefin, such as butadiene or isoprene; the rubbery copolymers of butadiene and styrene which may contain from 50 to 75% by weight of butadiene; and the rubbery copolymers of butadiene and acrylonitrile.

The products of the invention are useful as age resistors for raw rubber in latex form, coagulated rubber latices or vulcanized rubber and may be present in an amount of from .25 to 5% by weight, based on the weight of rubber, although it is generally preferred to use from 0.5 to 2% by weight, based on the weight of the rubber.

The antioxidants of this invention can be incorporated into rubber in any customary manner. They may be added in the form of physical mixtures or in the form of emulsions, using any of the known emulsifiers such as monovalent metal hydroxides, fatty acids, organic soaps, etc. Also, the individual components of the synergistic mixtures can be added to the rubber separately if desired without detracting from the synergistic effect. They may be added to the rubber in the form of latex, or they may be milled into coagulated rubber in the usual manner.

While certain representative embodiments and details have been shown for the purpose of illustrating the invention, it will be apparent to those skilled in this art that various changes and modifications may be made therein without departing from the spirit or scope of the invention.

I claim:

1. A synergistic antioxidant composition comprising a mixture of alkylated monohydroxy phenols comprised of (1) from 90 to 10 percent by weight of aralkyl phenols conforming to the following structural formula

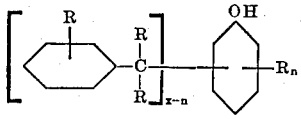

wherein R is selected from the group consisting of hydrogen and alkyl radicals having from 1 to 9 carbon atoms, $n$ is selected from 0, 1 and 2 and $x$ is selected from 1, 2 and 3 and wherein the value of $n$ is always at least 1 less than the value of $x$ and (2) from 10 to 90% by weight of tertiary alkylated phenols conforming to the following structural formula

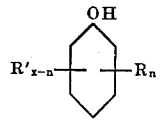

wherein $x$ is selected from 2 and 3 and $n$ is selected from 0, 1, 2 and 3 but not exceeding the value of $x$ and wherein R is selected from the group consisting of tertiary butyl and tertiary amyl radicals and R' is selected from the group consisting of tertiary octyl and tertiary nonyl radicals, R and R' being attached to the benzene ring in the 2, 4 and 6 positions.

2. A synergistic antioxidant composition comprising a mixture of alkylated monohydroxy phenols comprised of (1) from 90 to 10 percent by weight of the reaction product of one mole of a phenol and from 2 to 3 moles of an unsaturated organic material selected from the group consisting of styrene, vinyl toluene and a benzyl halide and (2) from 10 to 90 percent by weight of the alkylated reaction product resulting from the reaction of one mol of phenol and from two to three mols of two tertiary olefins, one of said olefins being selected from the group consisting of tertiary octenes and tertiary nonenes and another of said olefins being selected from the group consisting of isobutylene and tertiary pentenes, a major proportion of the olefins in said reaction product being selected from the group consisting of tertiary octenes and tertiary nonenes.

3. An oxidizable diene rubber containing as an antioxidant in an antioxidant amount a mixture of alkylated monohydroxy phenols comprised of (1) from 90 to 10 percent by weight of aralkyl phenols conforming to the following structural formula

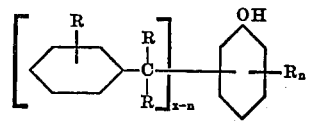

wherein R is selected from the group consisting of hydrogen and alkyl radicals having from 1 to 9 carbon atoms, $n$ is selected from 0, 1 and 2 and $x$ is selected from 1, 2 and 3 and wherein the value of $n$ is always at least 1 less than the value of $x$ and (2) from 10 to 90 percent by weight of tertiary alkylated phenols conforming to the following structural formula

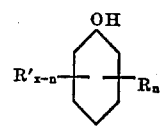

wherein $x$ is selected from 2 and 3 and $n$ is selected from 0, 1, 2 and 3 but not exceeding the value of $x$ and wherein R is selected from the group consisting of tertiary butyl and tertiary amyl radicals and R' is selected from the group consisting of tertiary octyl and tertiary nonyl radicals, R and R' being attached to the benzene ring in the 2, 4 and 6 positions.

4. An oxidizable diene rubber containing as an antioxidant in an antioxidant amount a mixture of alkylated monohydroxy phenols comprised of (1) from 90 to 10 percent by weight of the reaction product of one mole of a phenol and from 2 to 3 moles of an unsaturated organic material selected from the group consisting of styrene, vinyl toluene and a benzyl halide and (2) from 10 to 90 percent by weight of the alkylated reaction product resulting from the reaction of phenol and at least two tertiary olefins, one of said olefins being selected from the group consisting of tertiary octenes and tertiary nonenes and another of said olefins being selected from the group consisting of isobutylene and tertiary pentenes, a major proportion of the alkyl radicals in said reaction product being selected from the group consisting of tertiary octyl and tertiary nonyl radicals.

5. An oxidizable diene rubber containing as an antioxidant in an antioxidant amount a mixture of alkylated monohydroxy phenols comprised of (1) from 90 to 10 percent by weight of the reaction product of 1 mol of phenol and from 2 to 3 mols of styrene and (2) from 10 to 90 percent by weight of the alkylated reaction product resulting from the reaction of phenol and at least two tertiary olefins, one of said olefins being selected from the group consisting of tertiary octenes and tertiary nonenes and another of said olefins being selected from the group consisting of isobutylene and tertiary pentenes, a major proportion of the alkyl radicals in said reaction product being selected from the group consisting of tertiary octyl and tertiary nonyl radicals.

6. A synergistic antioxidant composition comprising a mixture of alkylated mono hydroxy phenols comprised of (1) from 90 to 10 percent by weight of aralkyl phenols conforming to the following formula

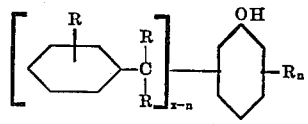

wherein R is selected from the group consisting of hydrogen and alkyl radicals having from 1 to 9 carbon atoms, $n$ is selected from 0, 1 and 2, and $x$ is selected from 1, 2 and 3, and wherein the value of $n$ is always at least 1 less than the value of $x$; and (2) from 10 to 90 percent by weight of tertiary alkyl phenols conforming to the following structural formula

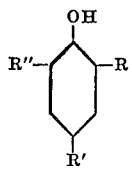

wherein R is a radical selected from the group consisting of tertiary octyl, tertiary nonyl, tertiary butyl and tertiary amyl radicals, R' is a radical selected from the group consisting of tertiary octyl and tertiary nonyl radicals and R" is a radical selected from the group consisting of tertiary butyl and tertiary amyl radicals.

7. A synergistic antioxidant composition comprising a mixture of alkylated monohydroxy phenols comprised of (1) from 80 to 20 percent by weight of the reaction product of one mol of a phenol selected from the group consisting of phenol, a xylenol and para cresol and from one to three mols of styrene, and (2) from 20 to 80 percent by weight of the alkylated reaction product resulting from the reaction of one mol of phenol with two mols of an olefin selected from the group consisting of diisobutylene and tertiary nonene and one mol of isobutylene.

8. A synergistic antioxidant composition comprising (1) from 80 to 20% by weight of the reaction product of one mol of phenol and from 1 to 3 mols of styrene and (2) from 20 to 80% by weight of the reaction product resulting from the reaction of 1 mol of phenol with 2 mols of diisobutylene nad 1 mol of isobutylene.

9. A synergistic antioxidant composition comprising 50% by weight of (1) the reaction product of 1 mol of phenol and 2 mols of styrene and 50% by weight of (2) the reaction product resulting from the reaction of 1 mol of phenol with 2 mols of diisobutylene and 1 mol of isobutylene.

10. An oxidizable diene rubber containing as an antioxidant from 0.5 to 2.0% by weight based on the weight of the rubber of the synergistic antioxidant composition of claim 8.

11. An oxidizable diene rubber containing as an antioxidant from 0.5 to 2.0% by weight based on the weight of the rubber of the synergistic antioxidant composition of claim 9.

References Cited in the file of this patent
UNITED STATES PATENTS

| | | |
|---|---|---|
| 2,202,877 | Stevens | June 4, 1940 |
| 2,605,251 | Kitchen | July 29, 1952 |
| 2,607,745 | Magoffin | Aug. 19, 1952 |
| 2,670,340 | Kehe | Feb. 23, 1954 |
| 2,704,746 | Chenicek | Mar. 22, 1955 |
| 2,731,442 | Forman | Jan. 17, 1956 |
| 2,769,784 | Young | Nov. 6, 1956 |
| 2,789,108 | Mills et al. | Apr. 16, 1957 |
| 2,822,404 | Amberlang | Feb. 4, 1958 |